(12) United States Patent
Yun

(10) Patent No.: US 9,034,498 B2
(45) Date of Patent: May 19, 2015

(54) SECONDARY BATTERY

(75) Inventor: Young-Kwang Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 677 days.

(21) Appl. No.: 13/231,858

(22) Filed: Sep. 13, 2011

(65) Prior Publication Data

US 2012/0148888 A1 Jun. 14, 2012

(30) Foreign Application Priority Data

Dec. 14, 2010 (KR) ........................ 10-2010-0127861

(51) Int. Cl.
| | | |
|---|---|---|
| *H01M 10/04* | (2006.01) | |
| *H01M 10/42* | (2006.01) | |
| *H01M 10/48* | (2006.01) | |
| *H01M 10/0565* | (2010.01) | |
| *H01M 6/50* | (2006.01) | |
| *H01M 2/36* | (2006.01) | |
| *H01M 2/10* | (2006.01) | |
| *H01M 2/02* | (2006.01) | |
| *H01M 2/08* | (2006.01) | |
| *H01M 10/052* | (2010.01) | |
| *H01M 2/12* | (2006.01) | |

(52) U.S. Cl.
CPC .......... *H01M 10/0565* (2013.01); *H01M 10/42* (2013.01); *H01M 6/5083* (2013.01); *H01M 10/4228* (2013.01); *H01M 2/1258* (2013.01); *H01M 6/50* (2013.01); *H01M 2/367* (2013.01); *H01M 2/1094* (2013.01); *H01M 2/021* (2013.01); *H01M 2/08* (2013.01); *H01M 10/052* (2013.01); *H01M 10/488* (2013.01); *Y02E 60/122* (2013.01)

(58) Field of Classification Search
USPC .............. 429/50–52, 61–64, 90–93, 96–100, 429/163–187; 29/623.1–623.5
See application file for complete search history.

(56) References Cited

U.S. PATENT DOCUMENTS

| | | | |
|---|---|---|---|
| 7,122,276 B2 * | 10/2006 | Gu ................................ | 429/162 |
| 7,618,724 B2 * | 11/2009 | Kim et al. ........................ | 429/7 |
| 2008/0292962 A1 | 11/2008 | Jung | |

FOREIGN PATENT DOCUMENTS

| | | |
|---|---|---|
| JP | 2007-265879 | 10/2007 |
| KR | 2001-0058677 A | 7/2001 |
| KR | 10-20060059714 | 6/2006 |

(Continued)

OTHER PUBLICATIONS

Machine Translation of Kim (KR 2001-0058677, published Jul. 2001, pp. 1-8).*

(Continued)

*Primary Examiner* — Basia Ridley
*Assistant Examiner* — Caitlin Wilmot
(74) *Attorney, Agent, or Firm* — Knobbe Martens Olson & Bear LLP

(57) ABSTRACT

A secondary battery including: an electrode assembly; a case for accommodating the electrode assembly and an electrolytic solution; and an identifying tape disposed in the case and that discolors when reacted with the electrolytic solution, wherein the identifying tape includes: a base film; an adhesive material disposed on one surface of the base film; and a discoloration material disposed on one surface of the base film.

20 Claims, 8 Drawing Sheets

(56) References Cited

FOREIGN PATENT DOCUMENTS

| KR | 10-0778407 B | 11/2007 |
| KR | 10-0891383 | 3/2009 |
| KR | 10-0927450 B | 11/2009 |
| KR | 1020100053457 A | 5/2010 |

OTHER PUBLICATIONS

Machine Translation of Lee (KR Oct. 2006-0059714, published Jun. 2006, pp. 1-11).*

Machine Translation of Seo (KR 2003-0071264, published Feb. 2002, pp. 1-9).*

* cited by examiner

SECONDARY BATTERY

RELATED APPLICATIONS

This application claims the benefit of Korean Patent Application No. 10-2010-0127861, filed on Dec. 14, 2010, in the Korean Intellectual Property Office, the disclosure of which is incorporated herein in its entirety by reference.

BACKGROUND

1. Field

One or more embodiments of the present invention relate to a secondary battery, and more particularly, to a structure of a secondary battery.

2. Description of the Related Art

In general, rechargeable secondary batteries, have been widely used in high-tech electronic devices such as cellular phones, notebook computers, and camcorders. In particular, lithium secondary batteries have a working voltage that is three times greater than those of nickel-cadmium (Ni—Cd) batteries and nickel-hydrogen (Ni—MH) batteries and are commonly used as power sources of electronic devices. Lithium secondary batteries also have a relatively great energy density per unit weight. Thus, much research into lithium secondary batteries has been performed.

Lithium secondary batteries are classified into liquid electrolyte batteries and polymer electrolyte batteries according to types of electrolytes. In general, lithium secondary batteries that contain a liquid electrolyte are called lithium ion batteries, and lithium secondary batteries that contain a polymer electrolyte are called lithium polymer batteries.

Lithium ion batteries use carbon in a negative electrode, a lithium oxide in a positive electrode, and an organic solvent electrolyte in an electrolytic solution. In lithium ion batteries, lithium ions reciprocate between a positive electrode and a negative electrode to generate electricity. Since lithium has a low charge and discharge efficiency, lithium ion batteries can be rapidly charged by intercalating lithium ions into a carbon layer having a high reaction rate. Lithium ion batteries may be manufactured in various shapes, for example, in a cylindrical shape or a square pillar shape.

In lithium ion batteries, a case may accommodate an electrode assembly and an electrolytic solution. If the electrolyte solution leaks during operation of the lithium ion batteries or during charging and discharging processes, a short circuit may occur or electronic devices around the lithium ion batteries may be contaminated.

SUMMARY

One or more embodiments of the present invention include a secondary battery in which an electrolyte leakage is easily detected.

Additional aspects will be set forth in the description which follows and, in part, will be apparent from the description, or may be learned by practice of the presented embodiments.

According to one or more embodiments of the present invention, a secondary battery includes an electrode assembly; a case for accommodating the electrode assembly and an electrolytic solution; and an identifying tape disposed in the case and that discolors when reacted with the electrolytic solution, wherein the identifying tape includes: a base film; an adhesive material disposed on one surface of the base film; and a discoloration material disposed on one surface of the base film.

The identifying tape may be disposed to correspond to a sealing portion of the case.

The adhesive material and the discoloration material may be disposed between the base film and the case.

The electrolytic solution may be a polymer and the case is a pouch case.

The case may include a first case and a second case, and the identifying tape may be disposed to correspond to a sealing portion for sealing the first case and the second case.

The first case and the second case may each include a sealing layer, a metal layer disposed on the sealing portion, and a coating layer disposed on the metal layer, wherein the identifying tape covers at least a side of the metal layer.

The identifying tape covers at least one portion of the first case and the second case.

The first case and the second case may each have a quadrangular shape, wherein at least one side of each of the first case and the second case is sealed, and the identifying tape is disposed to correspond to the sealing portion.

The secondary battery may further include an electrode extending from the electrode assembly, wherein the electrode passes and protrudes from between the first case and the second case, and the identifying tape covers at least one portion of the electrode.

The first case may accommodate the electrode assembly and one surface of the first case may have an opening, and the second case may close the opening of the first case and seal the electrolytic solution.

The secondary battery may further include an electrode extending from the electrode assembly, wherein the electrode penetrates the second case and protrudes from the second case, and the identifying tape is disposed to correspond to the electrode.

The second case may include a safety vent, and the identifying tape may be disposed to correspond to the safety vent.

The second case may include an electrolytic solution inlet, and the identifying tape may be disposed to correspond to the electrolytic solution inlet.

The base film may be a transparent layer, the base film may be an insulating layer, the discoloration material may include a litmus pigment, and the identifying tape may include a discoloration material that is disposed on another side of the base film.

The adhesive material may be transparent.

A secondary battery according to an embodiment of the present invention includes an identifying tape that easily detects leakage of an electrolytic solution occurring in a sealing portion of the secondary battery.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
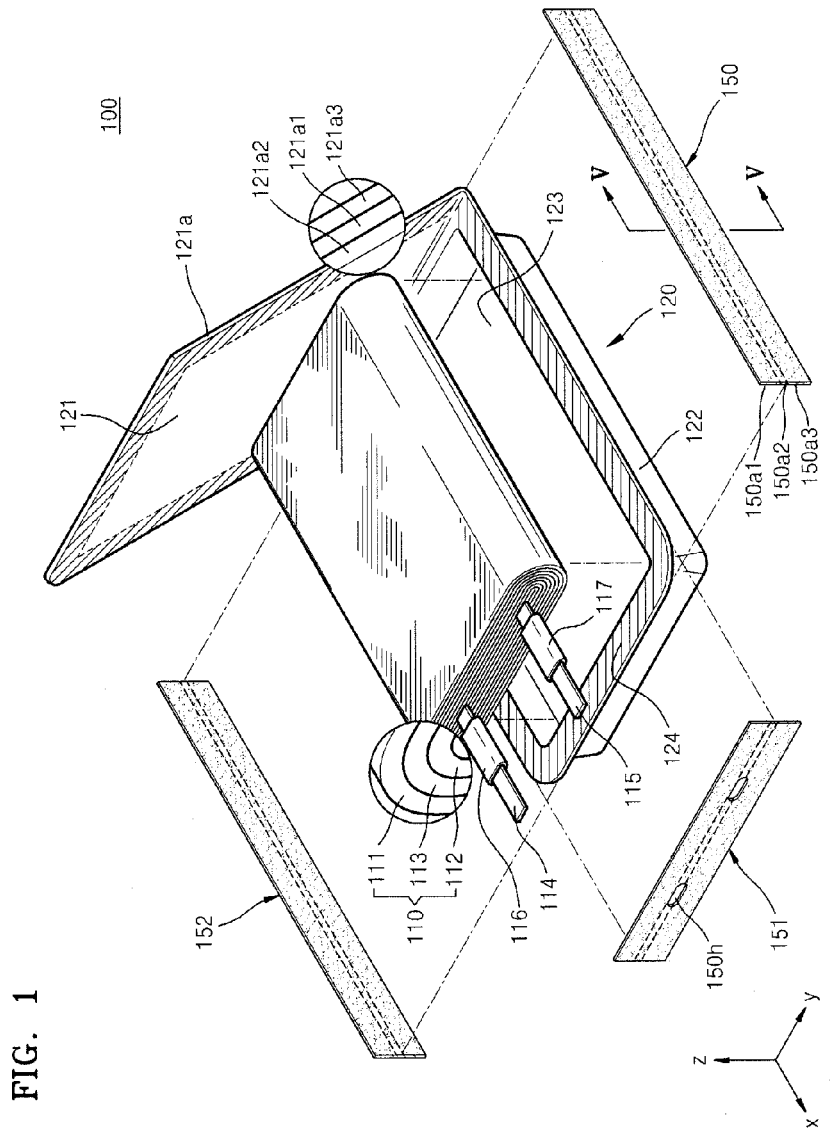
FIG. 1 is a schematic exploded perspective view of a secondary battery according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the present description, terms such as 'first', 'second', etc. are used to describe various members, components, regions, layers, and/or portions. However, it is obvious that the members, components, regions, layers, and/or portions should not be defined by these terms. The terms are used only for distinguishing one member, component, region, layer, or portion from another member, component, region, layer, or portion.

Figure 2:
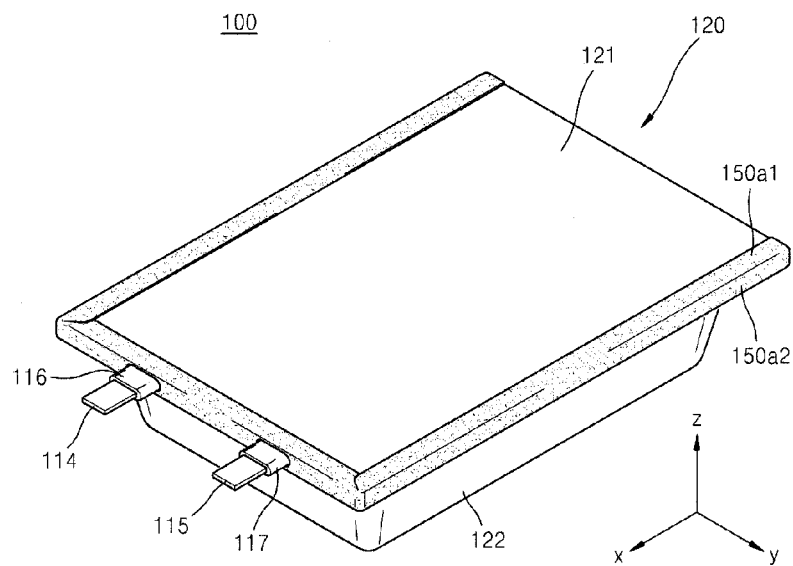
FIG. 2 is a schematic assembled top perspective view of the secondary battery of FIG. 1.
Figure 3:
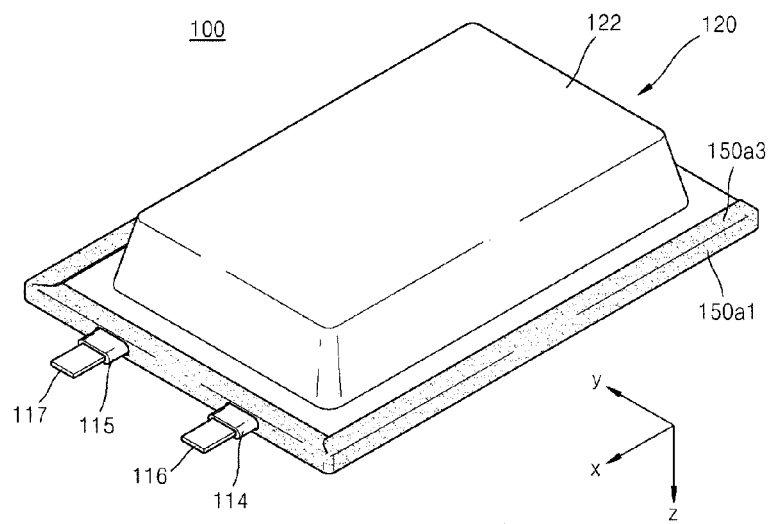
FIG. 3 is a schematic assembled bottom perspective view of the secondary battery of FIG. 1.
Figure 4:
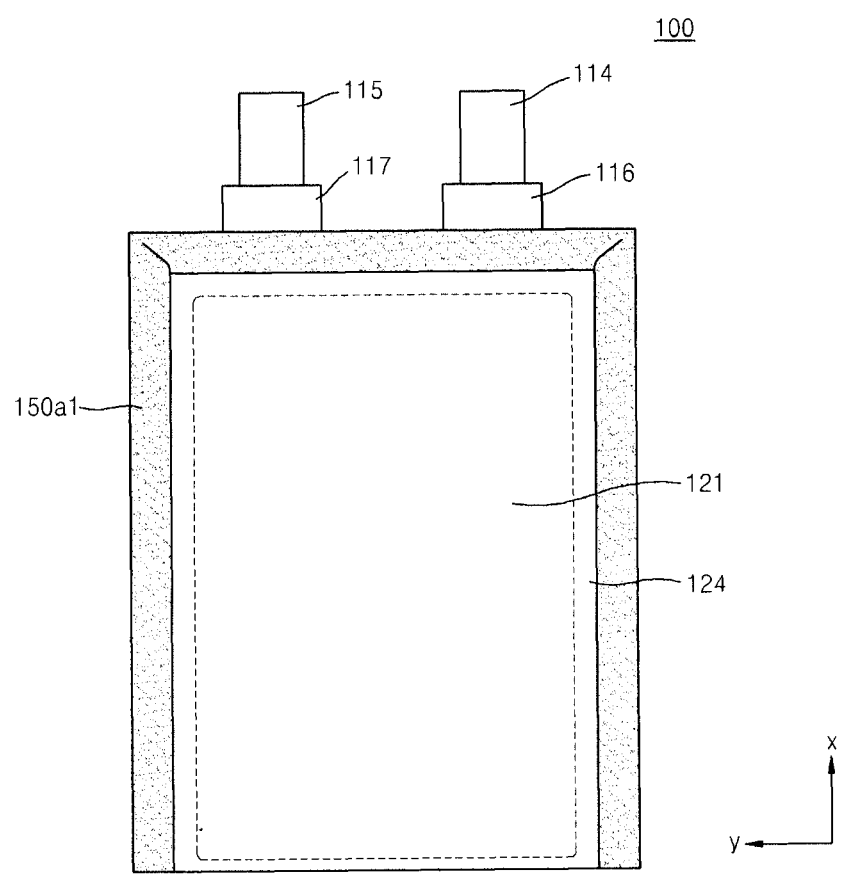
FIG. 4 is a top plan view of the secondary battery of FIG. 1.

FIG. 1 is a schematic exploded perspective view of a secondary battery 100 according to an embodiment of the present invention. FIG. 2 is a schematic assembled top perspective view of the secondary battery of FIG. 1. FIG. 3 is a schematic assembled bottom perspective view of the secondary battery of FIG. 1. FIG. 4 is a top plan view of the secondary battery of FIG. 1.

Referring to FIG. 1, the secondary battery 100 may be a polymer type secondary battery. The polymer type secondary battery 100 may include an electrode assembly 110, a case 120, an electrolytic solution (not shown), and an identifying tape 150.

The electrode assembly 110 may include a positive plate 111, a negative plate 112, and a separator 113 interposed between the positive plate 111 and the negative plate 112. Although FIG. 1 shows the electrode assembly 110 having a jelly roll structure formed by rolling the positive plate 111, the separator 113, and the negative plate 112, the structure of the electrode assembly 110 is not limited thereto. For example, the electrode assembly 110 may also be formed by sequentially stacking the positive plate 111, the separator 113, and the negative plate 112. The electrode assembly 110 may further include a positive tap 114 extending from the positive plate 111 and a negative tap 115 extending from the negative plate 112. In this regard, an insulating tape 116 for a positive electrode may be disposed on the positive tap 114. In addition, an insulating tape 117 for a negative electrode may be disposed on the negative tap 115.

The case 120 may accommodate the electrode assembly 110 and the electrolytic solution (not shown). The case 120 may be a flexible pouch case. The case 120 may include a first case 121 and a second case 122. The first case 121 and the second case 122 may each have a quadrangular shape. Referring to FIG. 1, the first case 121 and the second case 122 may be (initially) connected to each other on one side. In this regard, the first case 121 and the second case 122 are not limited thereto and may instead have any of various shapes.

The first case 121 may have a three-layered structure including a metal foil 121a1, and an internal insulating film 121a2 or coating layer and an external insulating film 121a3 or sealing layer stacked on opposite sides of the metal foil 121a1. In this regard, the structure of the first case 121 is not limited thereto and various functional layers may also be added thereto. In addition, although the structure of only the first case 121 is described, the second case 122 may also have the same stack structure as the first case 121.

The internal insulating film 121a2 may be a layer that is to be thermally fused. That is, layers that are to be thermally fused are formed on sides of the first case 121 and the second case 122 that face each other. In this regard, the internal insulating film 121a2 includes a polyolefin layer such as a casted polypropylene (CPP) layer. The CPP layer may be replaced with a material layer including a polyolefin resin selected from the group consisting of chlorinated polypropylene, polyethylene, an ethylenepropylene copolymer, a polyethylene-acrylic acid copolymer, and a polypropylene-acrylic acid copolymer.

The metal foil 121a1 layer may function as a substrate for maintaining mechanical strength and a barrier layer for preventing transmission of moisture and oxygen. For example, the metal foil 121a1 may include an aluminum (Al) layer. The external insulating film 121a3 may function as a substrate and a protective layer. In this regard, the external insulating film 121a3 may include, for example, nylon.

The first case 121 and the second case 122 may be sealed together by a sealing portion 124. In this regard, the sealing portion 124 may be sides of the internal insulating film 121a2, which is a layer that is to be thermally fused, of each of the first case 121 and the second case 122. The sealing portion 124 may be thermally fused to be sealed. In addition, the sealing portion 124 may cover the insulating tape 116, which is for a positive electrode, and the insulating tape 117, which is for a negative electrode, to seal the first case 121 and the second case 122. In this regard, the first case 121 and the second case 122 may be sealed by the sealing portion 124 while at least one portion of each of the positive tap 114 and the negative tap 115 protrudes out of the case 120.

The first case 121 and the second case 122 may each have a quadrangular shape, and the first case 121 and the second case 122 may be sealed on at least one side thereof. The identifying tape 150 may be disposed to correspond to the sealing portion 124.

Referring to FIG. 1, for example, the sealing portion 124 may include three sides of each of the first case 121 and the second case 122 and the remaining side of each of the first case 121 and the second case 122 (initially) connects the first case 121 and the second case 122 to each other. In this regard, the sealing of the first case 121 with the second case 122 is not limited thereto. Although not shown in FIG. 1, the first case 121 and the second case 122 may not be initially connected to each other and the sealing portion 124 may include four sides of each of the first case 121 and the second case 122 to seal the first case 121 and the second case 122. Alternately, two sides of each of the first case 121 and the second case 122 may be initially connected to each other, and the first case 121 and the second case 122 may be sealed by the other two sides. Alternately, three sides of each of the first case 121 and the second case 122 may be initially connected to each other, and the first case 121 and the second case 122 may be sealed by the remaining one side.

In this regard, if the electrolytic solution accommodated in the case 120 leaks out of the case 120, the leaked electrolytic solution may cause safety problems and pollute an environment around the case 120. Thus, the leaked electrolytic solution should be detected at an early stage of the leakage and the leakage should be managed for safety. The electrolytic solution may leak through the sealing portion 124 when sealing the case 120 due to defects or insulating resistance destruction. If a relatively small amount of the electrolytic solution leaks, it is difficult to immediately detect the leakage. The leaked electrolytic solution may deteriorate the performance of the secondary battery 100 and cause safety problems by corroding components around the secondary battery 100.

In order to detect the leaked electrolytic solution, the identifying tape 150 may be attached to the case 120. The identifying tape 150 may be attached to the case 120 to correspond to the sealing portion 124, which seals the first case 121 and the second case 122. In this regard, the identifying tape 150 may have a width sufficient for covering at least a portion of the first case 121 and the second case 122. In FIG. 1, the first case 121 and the second case 122 each having a quadrangular shape are initially connected to each other on one side, and the other three sides thereof are sealed by the sealing portion 124. Accordingly, the identifying tape 150 may be disposed on the three sides. In this regard, although identifying tapes 150, 151, and 152 respectively corresponding to the three sides are separately shown in FIG. 1, the identifying tapes 150, 151, and 152 may be connected to one another by being integrally formed. The positive tap 114 and the negative tap 115 may pass and protrude from between the first case 121 and the second case 122, and the identifying tape 150 may cover at least one portion of the positive tap 114 and/or the negative tap 115. When the secondary battery 100 is fabricated, an insulating tape for insulating the sealing portion 124 may be attached thereto. For example, the insulating tape may be disposed to cover a side of the metal foil 121a1 to prevent the side of the metal foil 121a1 from being exposed. In this regard, in addition to detecting the leaked electrolytic solution, the identifying tape 150 may also function as the insulating tape. That is, the identifying tape 150 may be disposed to cover at least the side of the metal foil 121a1 in order to insulate the metal foil 121a1 when the identifying tape 150 is attached to the case 120.

In this regard, the identifying tape 151 may have identifying tape holes 150h corresponding to the positive tap 114 and the negative tap 115. FIGS. 2, 3, and 4 are schematic top perspective, bottom perspective, and top plan views of the case 120, respectively. In this regard, a first region 150a1 of the identifying tape 150 may be attached to a top surface of the first case 121, a second region 150a2 of the identifying tape 150 may be attached to sides of the first case 121 and the second case 122, and a third region 150a3 of the identifying tape 150 may be attached to a bottom surface of the second case 122.

Referring to FIGS. 1 to 4, the identifying tape 150 corresponds to the three sides of the sealing portion 124, but the present embodiment is not limited thereto. In other words, the identifying tape 150 may be formed on portions of the three sides of the sealing portion 124 or the side on which the sealing portion 124 is not formed.

Figure 5A:
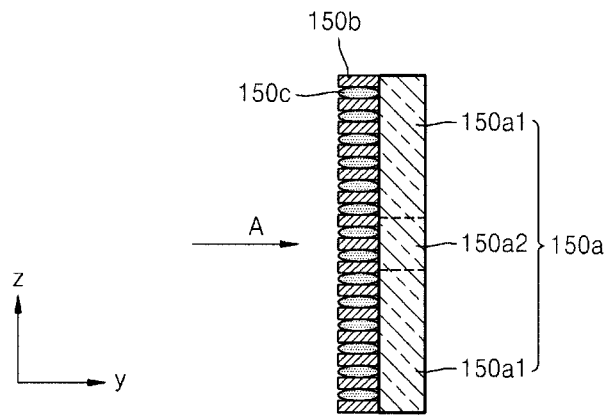
FIG. 5A is a schematic cross-sectional view taken along a line V-V of FIG. 1.

The identifying tape 150 will be describe with reference to FIG. 5A. FIG. 5A is a schematic cross-sectional view taken along a line V-V of FIG. 1. The identifying tape 150 may include a base film 150a, an adhesive material 150b, and a discoloration material 150c.

The base film 150a may be a transparent layer. Since the base film 150a is transparent, a change in the discoloration material 150c may be observed through the base film 150a. In addition, the base film 150a may be an insulating layer. Since the base film 150a is an insulating layer, the identifying tape 150 may function as an insulating tape.

The adhesive material 150b may be disposed on one surface of the base film 150a. The adhesive material 150b may also be transparent. The discoloration material 150c may include a material that reacts with the electrolytic solution and that discolors after it reacts with the electrolytic solution. For example, the discoloration material 150c may include a litmus pigment. The discoloration material 150c may be a piece of litmus paper. Accordingly, the litmus pigment may change color due to the acidity of the leaked electrolytic solution so that a user may detect the leakage of the electrolytic solution.

In addition, the discoloration material 150c may be a piece of oil paper that may absorb the electrolytic solution. In this regard, the oil paper may be a non-woven natural pulp fabric. The oil paper may absorb the leaked electrolytic solution. When the electrolytic solution, which may be initially neutral, contained in the case 120 contacts air, the electrolytic solution is acidified, and thus when the electrolytic solution contacts the oil paper, the oil paper discolors. In this regard, the discoloration material 150c may be a relatively small piece of the oil paper disposed on boundaries of the identifying tape 150 to contact with air.

Here, the adhesive material 150b may be disposed on one surface of the base film 150a, and the discoloration material 150c may also be disposed on the same. That is, the adhesive material 150b and the discoloration material 150c may be disposed on a single surface of the base film 150a. In other words, the adhesive material 150b and the discoloration material 150c may be disposed between the base film 150a and the case 120. As such, by disposing the discoloration material 150c on the same side as the adhesive material 150b, the leakage of the electrolytic solution may efficiently be detected. In FIG. 5A, a pathway on which the electrolytic solution leaks from the case 120 is shown by an arrow A. Accordingly, when the electrolytic solution leaks from the sealing portion 124, the leaked electrolytic solution contacts the surface of the identifying tape 150 adhered to the case 120 and on which the discoloration material 150c is formed, and thus the discoloration material 150c discolors. Even when a relatively small amount of the electrolytic solution leaks, the leaked electrolytic solution may reach the discoloration material 150c. In this regard, the identifying tape 150 is disposed to correspond to the sealing portion 124 to detect even a relatively small amount of the electrolytic solution since there is a high possibility that leakage of the electrolytic solution occurs at the sealing portion 124.

Figure 5B:
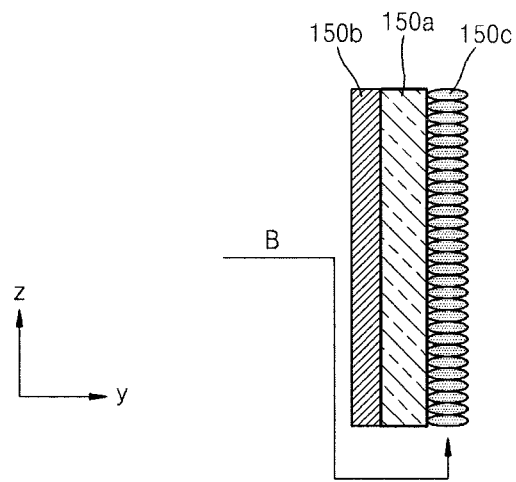
FIG. 5B shows a comparative embodiment of the secondary battery of FIG. 5A.

A comparative embodiment of FIG. 5A will be described with reference to FIG. 5B. In FIG. 5B, the discoloration material 50c and the adhesive material 50b are disposed on opposite sides of the base film 50a. In this regard, a pathway on which the electrolytic solution leaks is shown by an arrow B. In this regard, the amount of the leaked electrolytic solution should be relatively great to pass the sealing portion 124 and the base film 150a to contact the discoloration material 150c for the reaction between the electrolytic solution and the discoloration material 150c. In other word, a greater amount of the electrolytic solution is required (to leak) to detect the leakage of the electrolytic solution according to the comparative embodiment shown in FIG. 5B, when compared to the embodiment of FIG. 5A in which the discoloration occurs even when a relatively small amount of the electrolytic solution leaks. Thus, the comparative embodiment of FIG. 5B is not efficient.

Figure 6:
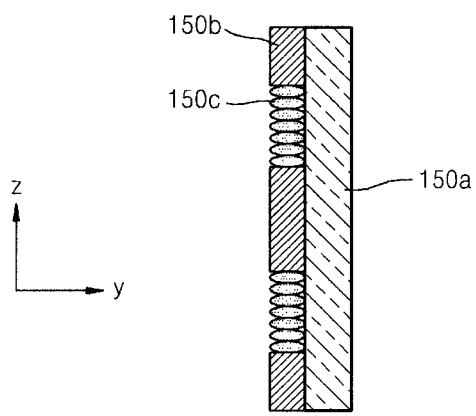
FIG. 6 shows a modification of the secondary battery of FIG. 5A.

Modifications of the embodiment shown in FIG. 5A will be described with reference to FIGS. 6 to 8. FIG. 6 shows a modification of the tape of FIG. 5A. Referring to FIG. 6, the adhesive material 150b and the discoloration material 150c are disposed on one surface of the base film 150a. In this regard, the adhesive material 150b may be used to form a pattern on the base film 150a. For example, referring to FIG. 6, layers formed of the adhesive material 150b may be formed spaced apart from each other, and the discoloration material 150c may fill the space between the layers formed of the adhesive material 150b.

Figure 7:
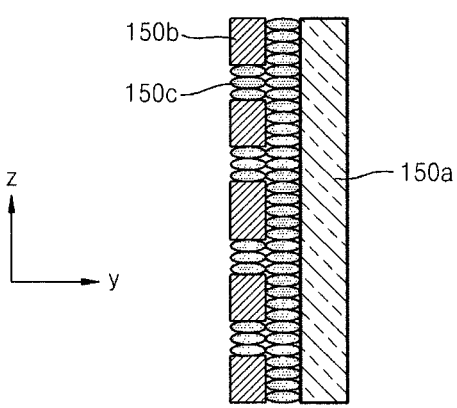
FIG. 7 shows another modification of the secondary battery of FIG. 5A.

FIG. 7 shows another modification of the tape of FIG. 5A. The adhesive material 150b and the discoloration material 150c are disposed on one surface of the base film 150a. In this regard, the discoloration material 150c may be used to form layers with patterns on the base film 150a. For example, referring to FIG. 7, the layers formed of the discoloration material 150c may be spaced apart from each other to form the patterns, and the adhesive material 150b may fill the space between the patterns formed of the discoloration material 150c. As shown in FIGS. 5A, 6, and 7, the discoloration material 150c is formed on one surface of the base film 150a to discolor when it contacts with the leaked electrolytic solution.

Figure 8:
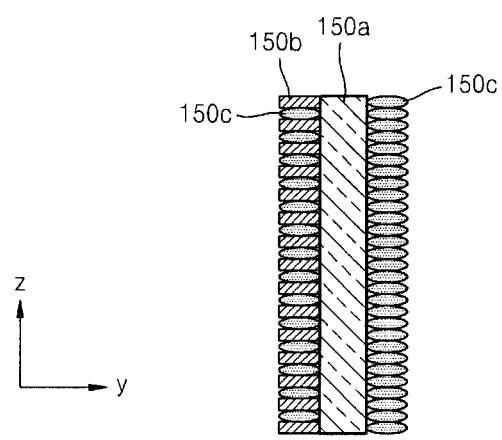
FIG. 8 shows another modification of the secondary battery of FIG. 5A.

FIG. 8 shows another modification of the tape of FIG. 5A. According to the embodiment shown in FIG. 8, the discoloration material 150c is further formed on another side of the base film 150a shown in FIG. 5A. Accordingly, the identifying tape 150 may react not only with the electrolytic solution leaked from the sealing portion 124 but also the electrolytic solution leaked from other portions of the case 120.

Figure 9:
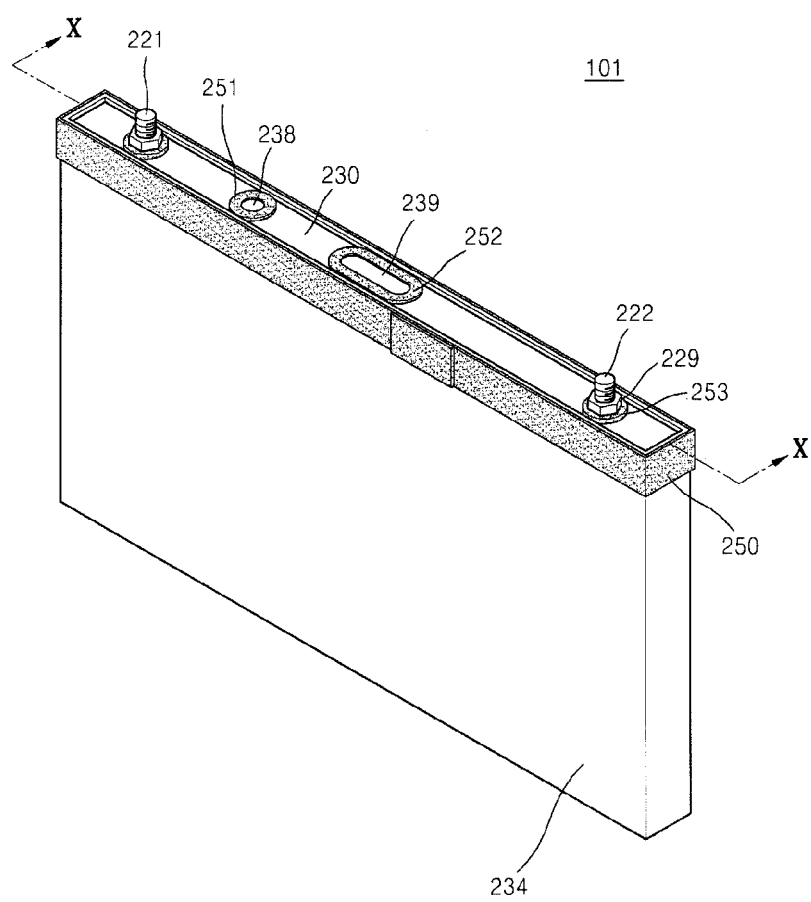
FIG. 9 is a schematic perspective view of a secondary battery according to another embodiment of the present invention.
Figure 10:
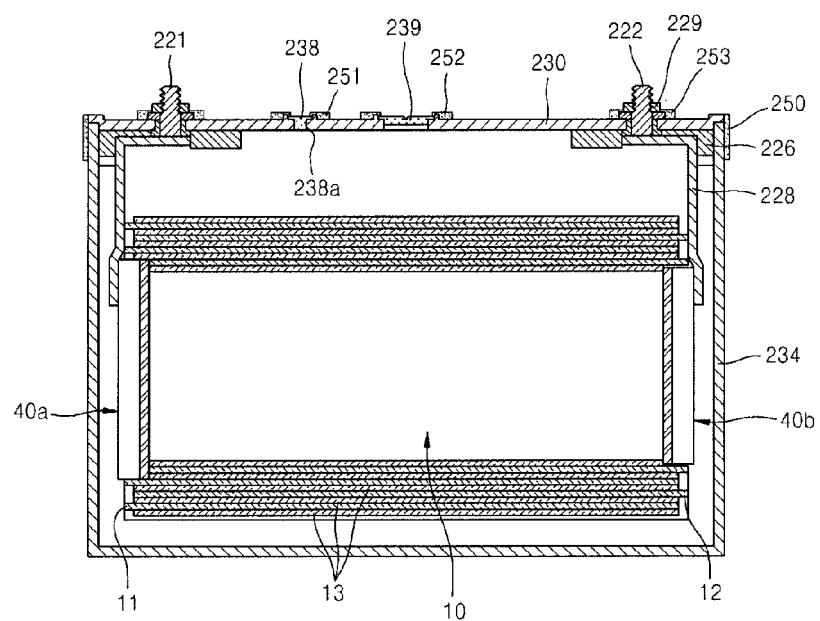
FIG. 10 is a schematic cross-sectional view taken along a line X-X of FIG. 9.

FIG. 9 is a schematic perspective view of a secondary battery 101 according to another embodiment of the present invention. FIG. 10 is a schematic cross-sectional view taken along a line X-X of FIG. 9.

The secondary battery 101 may include an electrode assembly 10, electrode terminals 221 and 222, and cases 230 and 234. In this regard, the cases 230 and 234 may accommodate the electrode assembly 10, which is electrically connected to an external device via the electrode terminals 221 and 222. The electrode assembly 10 may include a positive electrode 11, a negative electrode 12, and a separator 13. In this regard, the positive electrode 11, the negative electrode 12, and the separator 13 interposed between the positive electrode 11 and the negative electrode 12 are wound to form the electrode assembly 10. In this regard, the positive electrode 11, the separator 13, and the negative electrode 12 may be sequentially stacked to form the electrode assembly 10. Meanwhile, the electrode assembly 10 may be formed by winding the positive electrode 11, the negative electrode 12, and the separator 13 into a cylindrical shape and pressing the wound structure.

A positive current collecting unit 40a may be attached to a positive electrode uncoated portion of the electrode assembly 10 by welding. The positive current collecting unit 40a may be electrically connected to the electrode terminal 221, here, a positive terminal, using a lead member 228 as a medium. Accordingly, the positive electrode terminal 221 may be connected to the positive electrode 11 of the electrode assembly 10 via the lead member 228 and the positive current collecting unit 40a. A negative electrode current collecting unit 40b is electrically connected to the electrode terminal 222, here, a negative terminal, using another lead member 228 as a medium. Accordingly, the negative electrode terminal 222 may be connected to the negative electrode 12 of the electrode assembly 10 via the lead member 228 and the negative electrode current collecting unit 40b. An insulating member 226 is disposed between the lead member 228 and a case 230.

The electrode terminals 221 and 222 include the positive electrode terminal 221 and the negative electrode terminal 222. The positive electrode terminal 221 and the negative electrode terminal 222 are respectively electrically connected to the positive electrode 11 and the negative electrode 12 of the electrode assembly 10 and are exposed outside of the cases 230 and 234. Although not shown herein, the positive electrode terminal 221 or the negative electrode terminal 222 may be connected to the cases 230 and 234.

The cases 230 and 234 may include a first case 234 and a second case 230. An identifying tape 250 may be disposed on a sealing portion that seals the first case 234 and the second case 230. In this regard, the first case 234 accommodates the electrode assembly 10, and one surface of the first case 234 has an opening. The second case 230 may be a cap plate for closing the opening of the first case 234 to seal the electrolytic solution. In this regard, the identifying tape 250 may be disposed to correspond to a portion for sealing the first case 234 and the second case 230.

That is, the second case 230 may be disposed on one surface of the first case 234. The first case 234 may have a square pillar can shape with one surface open, and the second case 230 may seal the opening of the first case 234. The electrode assembly 10 and the electrolytic solution may be placed in the first case 234 via the opening of the first case 234. The second case 230 may cover the first case 234 in such a way that the electrode terminals 221 and 222 protrude from the first and second case 230 and 234. The boundary between the first case 234 and the second case 230 is welded by a laser beam to seal the first case 234 in which the electrode assembly 10 and the electrolytic solution are accommodated. In this regard, the portion welded by the laser beam may be the sealing portion.

The second case 230 may be a thin plate. The second case 230 may have an electrolytic solution inlet 238a through which the electrolytic solution is injected. A sealing cap 238 may be fixed to the electrolytic solution inlet 238a. An identifying tape 251 may be disposed to correspond to the electrolytic solution inlet 238a and the sealing cap 238. The identifying tape 251 may be disposed to cover at least one portion of the sealing cap 238 or along the shape of the sealing cap 238 around the sealing cap 238. Thus, the electrolytic solution leaking from the sealing cap 238 may be immediately detected. In this regard, the identifying tape 251 including the discoloration material 150c may be disposed adjacent to the sealing cap 238 to detect the leakage of an electrolytic solution.

In addition, a safety vent 239 having a groove that breaks at a predetermined internal pressure may be formed in the second case 230. An identifying tape 252 may be disposed to correspond to the safety vent 239. That is, the identifying tape 252 may be disposed to cover at least one portion of the safety vent 239 or along the shape of the safety vent 239 around the safety vent 239. An identifying tape 252 may include the base film 150a. The discoloration material 150c may be disposed between the base film 150a and the safety vent 239.

An identifying tape 253 may be disposed to correspond to the electrode terminals 221 and 222 penetrating the second case 230 and protruding from the second case 230. In this regard, the identifying tape 253 may be disposed to cover at least one portion of the electrode terminals 221 and 222 or along the shape of the electrode terminals 221 and 222 around the electrode terminals 221 and 222. In this regard, the discoloration material 150c may be disposed between the base film 150a and the electrode terminals 221 and 222.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A secondary battery comprising:
   an electrode assembly;
   a case for accommodating the electrode assembly and an electrolytic solution; and
   an identifying tape disposed in the case and that discolors when reacted with the electrolytic solution,
   wherein the identifying tape comprises:
   a base film;
   an adhesive material disposed on one surface of the base film; and
   a discoloration material disposed on one surface of the base film wherein the case comprises a first case and a second case, and the identifying tape is disposed to correspond to a sealing portion for sealing the first case and the second case and wherein the identifying tape is disposed on both the first and second case wherein the adhesive material and the discoloration material are disposed between the base film and the case and are arranged so as to be planar with each other.

2. The secondary battery of claim 1, wherein the identifying tape is disposed to correspond to a sealing portion of the case.

3. The secondary battery of claim 1, wherein the electrolytic solution is a polymer and the case is a pouch case.

4. The secondary battery of claim 1, wherein the first case and the second case each comprise a sealing layer, a metal layer disposed on the sealing layer and a coating layer disposed on the metal layer, wherein the identifying tape covers at least a side of the metal layer.

5. The secondary battery of claim 1, wherein the identifying tape covers at least one portion of the first case and the second case.

6. The secondary battery of claim 1, wherein the first case and the second case each have a quadrangular shape, wherein at least one side of each of the first case and the second case is sealed, and the identifying tape is disposed to correspond to the sealing portion.

7. The secondary battery of claim 1, further comprising an electrode extending from the electrode assembly, wherein the electrode passes and protrudes from between the first case and the second case, and the identifying tape covers at least one portion of the electrode.

8. The secondary battery of claim 1, wherein the first case accommodates the electrode assembly and one surface of the first case has an opening, and the second case closes the opening of the first case and seals the electrolytic solution.

9. The secondary battery of claim 8, further comprising an electrode extending from the electrode assembly, wherein the electrode penetrates the second case and protrudes from the second case, and the identifying tape is disposed to correspond to the electrode.

10. The secondary battery of claim 8, wherein the second case comprises a safety vent, and the identifying tape is disposed to correspond to the safety vent.

11. The secondary battery of claim 8, wherein the second case comprises an electrolytic solution inlet, and the identifying tape is disposed to correspond to the electrolytic solution inlet.

12. The secondary battery of claim 1, wherein the base film is a transparent layer.

13. The secondary battery of claim 1, wherein the base film is an insulating layer.

14. The secondary battery of claim 1, wherein the discoloration material comprises a litmus pigment.

15. The secondary battery of claim 1, wherein the identifying tape comprises a discoloration material that is disposed on another side of the base film.

16. The secondary battery of claim 1, wherein the adhesive material is transparent.

17. A secondary battery comprising:
   an electrode assembly;
   a case for accommodating the electrode assembly and an electrolytic solution wherein the case has seams and openings;
   an identifying tape disposed on the case so as to be positioned adjacent the seams or openings of the case so that electrolyte solution leaking from the seams or openings induce the identifying tape to change color wherein the identifying tape comprises a base layer having a first and second surface wherein adhesive and a discoloration pigment is applied to the first surface of the base layer wherein the case comprises a first case and a second case, and the identifying tape is disposed to correspond to the seams for sealing the first case and the second case and wherein the identifying tape is disposed on both the first and second case wherein the adhesive material and the discoloration material are disposed between the base film and the case and are arranged so as to be planar with each other.

18. The secondary battery of claim 17, wherein the case is comprised of a first and second case that are sealed together in a seam and wherein the identifying tape is positioned on both the first and second case adjacent the seam.

19. The secondary battery of claim 18, wherein the case includes openings for electrodes, vent openings and openings for providing the electrolyte solution into the interior of the case and wherein the identifying tape is positioned proximate the electrode openings, the vent openings, and the openings for providing the electrolyte solution into the case.

20. The secondary battery of claim 17, wherein the first surface of the base layer faces at least one of the seams and the openings of the case.

* * * * *